United States Patent
Oswald et al.

(10) Patent No.: US 11,111,110 B2
(45) Date of Patent: Sep. 7, 2021

(54) SHORTENING HOOK WITH COUPLING CONNECTION

(71) Applicant: pewag austria GmbH, Kapfenberg (AT)

(72) Inventors: Bernhard Oswald, Kapfenberg (AT); Rene Zettler, Bruck an der Mur (AT)

(73) Assignee: pewag austria GmbH, Kapfenberg (AT)

( * ) Notice: Subject to any disclaimer, the term of this patent is extended or adjusted under 35 U.S.C. 154(b) by 0 days.

(21) Appl. No.: 16/786,885

(22) Filed: Feb. 10, 2020

(65) Prior Publication Data
US 2020/0290845 A1    Sep. 17, 2020

(30) Foreign Application Priority Data
Mar. 14, 2019   (DE) ............... 20 2019 101 470.9

(51) Int. Cl.
*B66C 1/12* (2006.01)
*F16G 15/00* (2006.01)
*F16G 17/00* (2006.01)

(52) U.S. Cl.
CPC .............. *B66C 1/125* (2013.01); *F16G 15/00* (2013.01); *F16G 17/00* (2013.01)

(58) Field of Classification Search
CPC .. B66C 1/125; B66C 1/12; B66C 1/14; B66C 1/18; B66C 1/30; B66C 1/34; F16G 15/00; F16G 17/00; F16G 11/14; F16G 11/143
USPC ............... 294/82.11, 82.14, 82.24; 24/134 R
See application file for complete search history.

(56) References Cited

U.S. PATENT DOCUMENTS

| | | | | |
|---|---|---|---|---|
| 2,043,460 A | * | 6/1936 | Young | E21B 19/06 294/82.1 |
| 2,552,758 A | * | 5/1951 | Andersen | B66C 1/12 294/82.1 |
| 3,194,598 A | * | 7/1965 | Goldfuss | B66C 1/36 294/82.19 |
| 3,333,412 A | * | 8/1967 | Rieger | B66C 1/36 59/93 |
| 3,601,978 A | * | 8/1971 | Rieger | F16G 17/00 59/93 |
| 3,795,951 A | * | 3/1974 | Ratcliff | B66C 1/34 294/82.1 |

(Continued)

FOREIGN PATENT DOCUMENTS

WO    WO 97/23405 A1    7/1997
WO    WO 2017/075605 A1    5/2017

*Primary Examiner* — Paul T Chin
(74) *Attorney, Agent, or Firm* — Christensen, Fonder, Dardi & Herbert PLLC

(57) ABSTRACT

A shortening hook with a coupling connection for shortening sling chains in hangers, having a hook body which comprises an eyelet at the top for coupling to a suspension ring and at the bottom a coupling connection with a coupling slot which is delimited by two parallel side wings and is downwardly open for the suspension of a chain and in its central region comprises a hooking-in region, which realizes an upwardly open, rectilinearly extending shortening slot and on which a chain, which is coupled to the coupling connection, is hookable by way of its free end region. In each case, only a coupling slot and a shortening slot are realized on the hook body and, when the shortening hook is seen in side view, are mounted offset laterally with respect to one another.

5 Claims, 2 Drawing Sheets

(56) References Cited

U.S. PATENT DOCUMENTS

| | | | | |
|---|---|---|---|---|
| 4,151,708 A | * | 5/1979 | Smetz | F16G 17/00 |
| | | | | 59/93 |
| 4,330,990 A | * | 5/1982 | Schreyer | F16G 17/00 |
| | | | | 294/82.17 |
| 4,363,509 A | * | 12/1982 | Schreyer | B60C 27/08 |
| | | | | 24/698.1 |
| 4,466,651 A | * | 8/1984 | Sowa | E21B 19/02 |
| | | | | 294/82.1 |
| 5,307,751 A | * | 5/1994 | Shell | F16G 11/14 |
| | | | | 114/218 |
| 5,851,040 A | | 12/1998 | Fredriksson | |
| 5,884,950 A | * | 3/1999 | Fredriksson | B66C 1/125 |
| | | | | 294/82.11 |
| 6,913,301 B2 | * | 7/2005 | Gotz | B66C 1/14 |
| | | | | 24/598.5 |
| 6,948,752 B1 | | 9/2005 | Crow | |

\* cited by examiner

SHORTENING HOOK WITH COUPLING CONNECTION

PRIORITY CLAIM

The present application claims priority to German Patent Application No. 20 2019 101 470.9, filed on Mar. 14, 2019, which said application is incorporated by reference in its entirety herein.

FIELD OF THE INVENTION

The invention relates to a shortening hook with a coupling connection for shortening sling chains in hangers.

BACKGROUND OF THE INVENTION

Such shortening hooks, as are offered commercially, comprise a hook body which includes an eyelet at the top for coupling to a suspension ring and at the bottom a coupling connection with a coupling slot which is delimited by two parallel side wings and is downwardly open for the suspension of a chain. A hook-in region, which realizes an upwardly open, rectilinearly extending shortening slot, on which a chain, which is coupled to the coupling connection, is hookable by way of its free end region, is realized in the central region of the hook body which lies between the upper eyelet and the lower coupling connection. As both the coupling connection, in which the chain hangs permanently, and the shortening slot, in which the chain is shortened, are realized on such a shortening hook, only said shortening hook is also necessary both as shortener and as connecting part between the suspension ring and the chain.

Frequently when used in a two-strand hanger, two such hooks are mounted on a suspension ring, wherein on each of the same the eyelet, the shortening slot and the coupling part are arranged in a line one below the other. In this case, the center of gravity of each hook also lies along said line so that both hooks are aligned such that the shortening slots of both hooks each lie not only in one axis but also in each case side by side so that simple shortening of the chain is blocked. It is not even possible to create a remedy for this by one of the two hooks being fastened to the eyelet offset by 180° with respect to the other one as the hook tips do then point in different directions but the shortening slots are still located precisely side by side.

Shortening hooks, which, along with a large upper eyelet, comprise two coupling connections which are mounted side by side at the bottom, have already also been offered commercially. A hooking-in region with an upwardly open shortening slot is provided in each case in the central region of the respective hook body to each of the two sides thereof. Consequently, it is certainly possible when using such a shortening hook in a two-strand hanger to avoid mounting a second injury hook for such hangers. However, the disadvantage of such shortening hooks is that two hook regions, each realizing a shortening slot, and at the bottom also two coupling connections are provided on one shortening hook at the same time. This results in each of said hooking-in regions practically never being able to align optimally to the chain, i.e. that the respective shortening slot would point in the direction of the hooked-in chain.

SUMMARY OF THE INVENTION

Proceeding from here, the object underlying the invention is to propose a shortening hook with a coupling connection which allows the chain not only to be suspended in a particularly easy manner in the shortening slot and where, with the chain suspended in the shortening slot, the hook aligns automatically in the tensile direction of the chain such that the shortening slot always points in the direction of the chain, which produces an optimum alignment. This is especially important, in particular, where two shortening hooks according to the invention are mounted on the upper eyelet, in an alignment offset by 180° with respect to one another, for use with two-strand hangers.

This is achieved according to the invention by a shortening hook with a coupling connection for shortening sling chains in hangers, having a hook body which comprises an eyelet at the top for coupling to a suspension ring and at the bottom a coupling connection with a coupling slot which is delimited by two parallel side wings and is downwardly open for the suspension of a chain and in its central region comprises a hooking-in region, which realizes an upwardly open, rectilinearly extending shortening slot and on which a chain, which is coupled to the coupling connection, is hookable by way of its free end region, wherein in each case only a coupling slot and a shortening slot are realized on each hook body and, when the shortening hook is seen in side view, coupling slot and shortening hook are mounted offset laterally with respect to one another. By the shortening slot and the coupling slot being offset laterally with respect to one another and no longer being aligned, as in the case of known shortening hooks, in a line with one another and with the upper eyelet, the center of gravity of the shortening hook is also displaced laterally compared to said known hook.

As a result of the chain hanging permanently, as a rule, on the coupling connection, with the connecting hook in the otherwise unloaded state, the coupling slot is aligned relative to the upper eyelet on account of said chain weight such that they both lie perpendicularly one above the other. This results in the hooking-in region, which is realized in the case of the shortening hook according to the invention and realizes the shortening slot, protruding laterally on one side of the shortening hook, as a result of which, when the chain is suspended in the shortening slot for shortening, the chain is easily able to be suspended by the operator in the shortening slot. It is no longer necessary, in this case, as in the case of the known shortening hooks described in the introduction, to position the respective hooking-in region such that the slot is easily accessible, which is particularly advantageous when both hands have to be used to suspend the chain or a second person has to be involved on account of the weight thereof.

Once the chain is suspended in the shortening slot, the shortening hook according to the invention is pivoted about the eyelet suspension automatically such that the shortening slot and coupling slot are aligned in the tensile direction of the chain portion cooperating there in each case so that the chain lies correctly in the hook.

If for use with a two-strand hanger, two shortening hooks according to the invention are arranged with their upper eyelets on the suspension ring, each, however, rotated by 180° with respect to one another, the achievement through the design according to the invention of the two shortening hooks is that the hooking-in regions of both shortening hooks are not located, as in the case of the known shortening hooks depicted in the introduction, directly side by side but are aligned offset to one another in a non-congruent manner to both sides of the arrangement and there each protrude laterally such that good accessibility to the coupling slots is ensured here too. Here too, with the chain completely mounted, the respective shortening slots are then automatically aligned in the tensile direction of the chain portion connected there in each case.

In the case of the shortening hook according to the invention, it is particularly advantageous when the shortening slot is aligned at an acute angle relative to the coupling slot, which diverges downward on the hook body, wherein, once again in a preferred manner, said angle is within the range of between 10° and 40°, in a particularly preferred manner is 15°. As a result, a visual design of the shortening hook according to the invention is achieved which allows for particularly favorable accessibility of the shortening slot and favorable alignment of the chain portions mounted on the respective shortening hook.

It is additionally advantageous in the case of the invention when the eyelet at the top of the hook body comprises a circular cross section and the longitudinal center line of the coupling slot extends through the center point of the cross section of the eyelet.

It is additionally advantageous in the case of the invention when a safety catch is mounted at the inlet of the shortening slot which prevents a suspended chain link or a suspended chain portion being able to escape from the shortening slot in an unwanted manner.

BRIEF DESCRIPTION OF THE DRAWINGS

The invention is explained in more detail, in principle by way of example, on the basis of drawings, in which.

DETAILED DESCRIPTION

In the following realizations, the same reference symbols are used in the figures for the same parts or for parts which correspond to one another even if said parts demonstrate designs which differ from one another.

Figure 1:
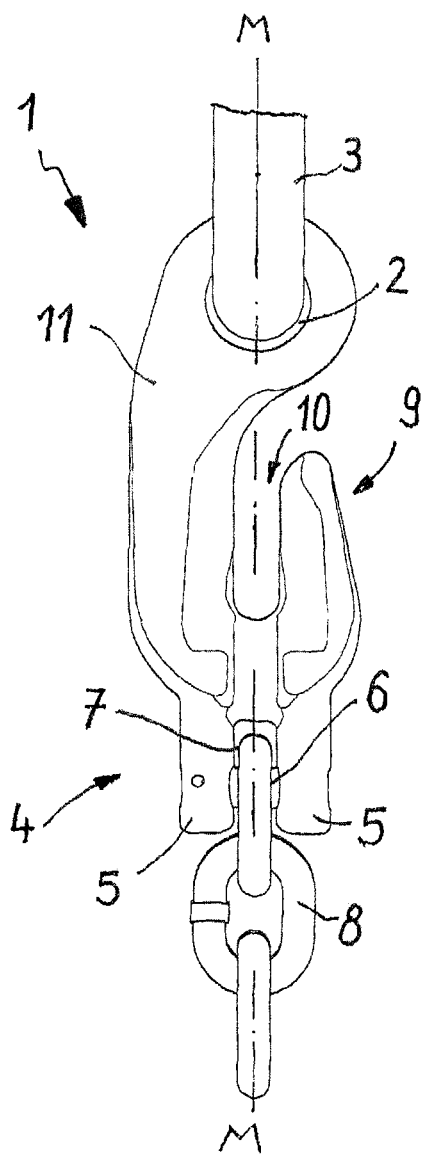
FIG. 1 shows a shortening hook from the prior art.

The shortening hook 1 shown in FIG. 1 corresponds to the shortening hook which is known from the prior art and has been described further above in the introduction.

Said shortening hook 1 comprises at the top an eyelet 2 by way of which it is mounted on a suspension ring 3.

Figure 2:
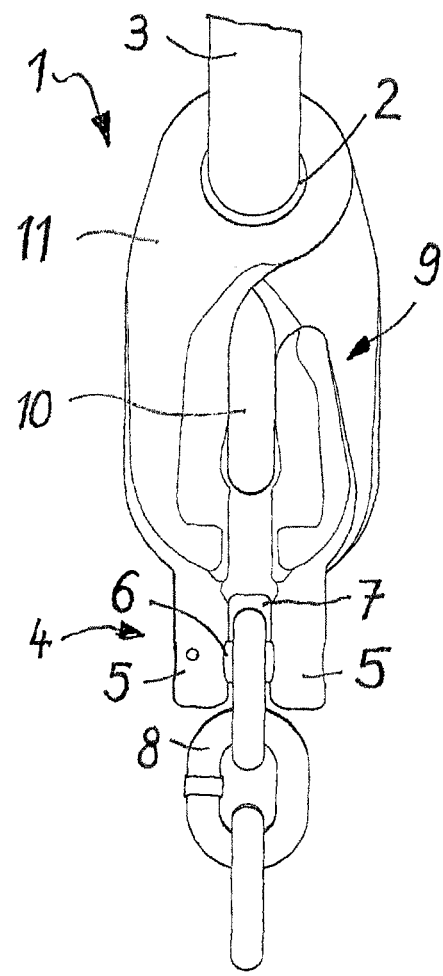
FIG. 2 shows the arrangement of two shortening hooks from the prior art according to FIG. 1 but rotated by 180° with respect to one another, both being mounted on a suspension ring.

FIG. 2 then shows an arrangement in which two such known shortening hooks 1 are mounted together on the upper suspension ring 3, the two shortening hooks, however, being inserted in an arrangement rotated by 180° with respect to one another.

Each of said shortening hooks 1 is provided with a coupling connection 4 on its oppositely situated, lower end along with its upper eyelet (the designation "at the top" is used such that it is associated with the end region of the shortening hook 1 facing the suspension ring 3). As FIGS. 1 and 2 show, said coupling connection 4 includes two side wings 5 which are directed parallel to one another and between which a coupling slot 7 is realized.

A mounting bolt 6, on which a sling chain 8 to be connected can be mounted on the shortening hook 1, extends inside the coupling slot 7 between the two side wings 5.

Usually, in the case of a shortening hook 1, a sling chain 8 is, generally speaking, already mounted permanently on the coupling connection 4.

In the region between the upper eyelet 2 and the lower coupling connection 4, the hook body 11 realizes, in its central portion, a hooking-in region 9 which realizes an open, rectilinear shortening slot 10 which extends upward in a hook-shaped manner, on which a sling chain 8, which is coupled to the coupling connection 4, is hookable by way of its free end region.

As FIGS. 1 and 2 show with regard to the prior art, in the case of said known shortening hook 1, the upper eyelet 2, the upwardly extending shortening slot 10 and the coupling slot 7 realized in the coupling connection 4 are aligned in a row with respect to one another, i.e. the center line of coupling slot 7 and shortening slot 10 and the center of the upper eyelet 2 are all positioned along a straight line M aligned with respect to one another (cf. the dot-dashed straight line in FIG. 1).

For use with a two-strand hanger, two of the known shortening hooks 1, as shown in FIG. 2, are mounted corresponding to FIG. 1 with their upper eyelet 2 on the suspension ring 3, such that the alignment of the two hooks by 180° is undertaken in opposite directions to one another, as shown in FIG. 2, the hook tips of the hooking-in regions 9 pointing in opposite directions to one another.

As, in this case, the two shortening hooks 1 used comprise, in each case, eyelet 2, coupling slot 7 and shortening slot 10, which are each aligned with respect to one another along a line, the center of gravity of each of said hooks 1 is positioned such that the hooks 1 are aligned such that the shortening slots 10 of both hooks 1 are positioned in a common axis, which blocks simple shortening of the chain. Said state is shown in FIG. 2.

Figure 5:
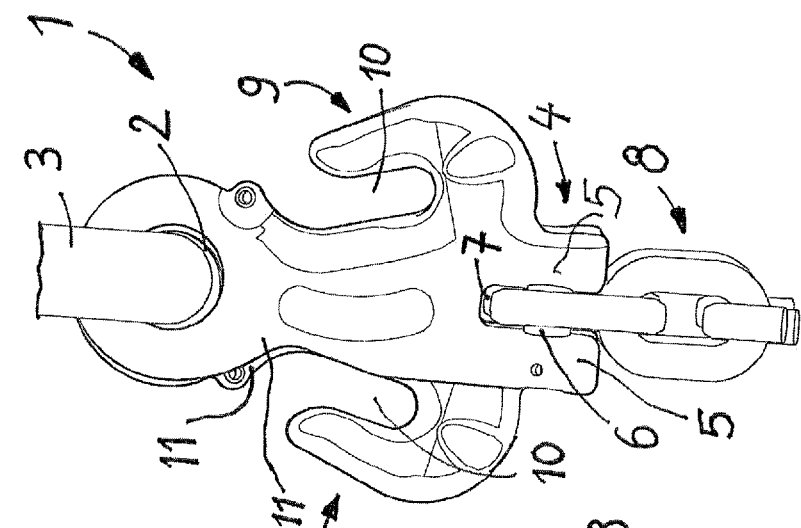
FIG. 5 shows an arrangement corresponding to FIG. 2 of two shortening hooks according to FIG. 3 on a suspension ring, with an arrangement of both shortening hooks rotated by 180° with respect to one another and the representation of the end of a sling chain mounted on the coupling connection realized on the connecting hook positioned at the front in the arrangement shown.
Figure 4:
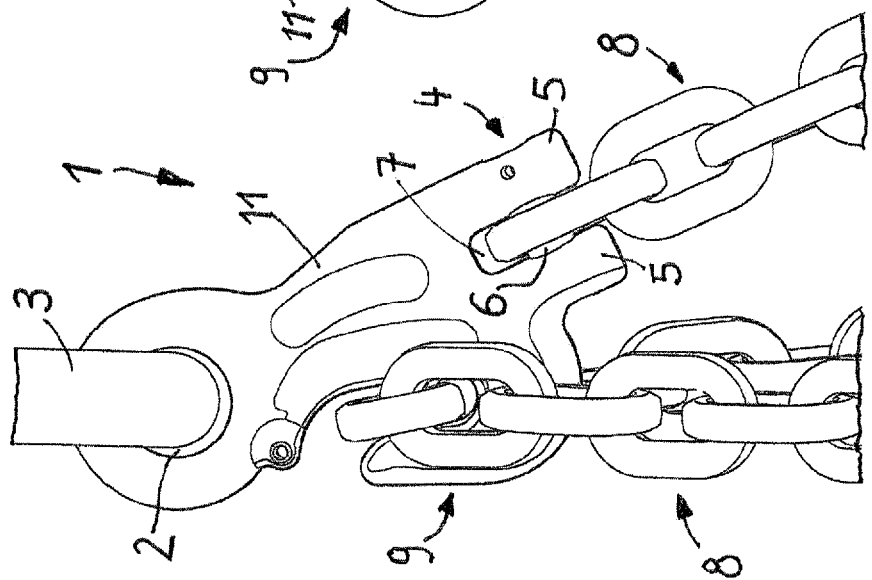
FIG. 4 shows the representation of a shortening hook according to FIG. 3 mounted on a suspension ring, with a sling chain which is mounted by way of one end on the coupling connection and is hooked into the shortening slot of the shortening hook at its other end region
Figure 3:
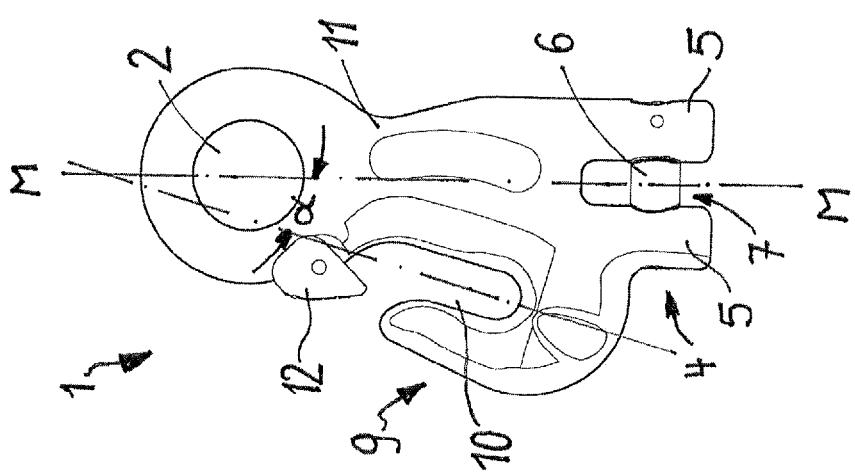
FIG. 3 shows a side view of a shortening hook according to the invention.

FIGS. 3 to 5 then show a shortening hook 1 according to the new invention:

Here too, a shortening slot 10 is realized on the hook body 11 in each case on one side of the same and a coupling connection 5 with a coupling slot 7 is realized at the bottom.

However, in the case of said hook design, the hooking-in region 9, which is provided once again between the upper eyelet 2 and the lower coupling connection 4, is provided with the shortening slot 10, which is realized thereon and is upwardly open in a straight line such that, when seen in a side view of the shortening hook 1, the coupling slot 7 and the shortening slot 10 are realized offset laterally with respect to one another; consequently shortening slot 10 and coupling slot 7 are no longer positioned, as in the case of the known chain form according to claims 1 and 2, both coaxially to the center point of the upper eyelet 2.

Rather, the center of gravity of said hook 1 is also displaced laterally compared to the known hook from FIG. 1.

As in the case of shortening hooks 1, the sling chain 8 is mounted permanently, generally speaking, in the coupling slot 7 on the coupling connection 4, the overall center of gravity, in this case, is displaced by the weight of the sling chain 8 mounted at the bottom such that the eyelet 2 and the coupling part 4 of the shortening hook 1, when this latter is fastened with its upper eyelet 2 to a suspension ring 3, are aligned vertically, which results in the shortening slot 10, as a consequence of its lateral offset to the coupling slot 7, protruding significantly to the side. As a desired chain shortening is always performed with the shortening hook 1 in the so-called non-loaded state (i.e. shortening hook 1 with the chain 8 mounted at the bottom), only the dead weight of the hanger overall is significant.

It can be seen from this that the outwardly offset shortening slot 10 is more easily accessible for the operator for the suspension of a sling chain 8 for shortening the overall hanger than in the case of the known hook according to FIG. 1, which makes it easier for a user to suspend the sling chain 8 in the shortening slot 10. For it is no longer necessary to position the shortening hook 1 such that the shortening slot 10 is easily accessible. Said advantage is particularly great when both hands of the user are necessary to suspend the shortening chain 1 on account of the weight thereof.

FIG. 4 then shows the shortening hook 1 from FIG. 3 in a state in which the sling chain 8, which is mounted at the bottom in the coupling connection 4, is introduced at its other end into the shortening slot 10 of the hooking-in region 9.

On account of the overall weight, due to the suspension of the sling chain 8 in the shortening slot 10, the then effective overall center of gravity on the shortening hook 1 once again results in a vertical alignment of eyelet 2 and coupling part 4. In this case, the state, as can be seen in FIG. 4, occurs where, namely, the shortening slot 10 with the portion of the sling chain 8 mounted thereon and the coupling slot 7 with the end link of the sling chain 8 mounted there are aligned in each case in the tensile direction of the chain such that the chain is positioned correctly in the hook; consequently the slots always point in the direction of the connected chain portion and there is no tilting between chain and slot.

If, for use in the case of a two-strand hanger, two such hooks 1 as are shown in FIG. 3 are mounted on a suspension ring 3, the arrangement as can be found in FIG. 5 is produced. Here too, as in the case of the arrangement from FIG. 2, the two shortening hooks 1 are mounted in the opposite alignment to one another on the suspension ring 3 so that the shortening slots 10 of both shortening hooks 1 protrude outwardly on opposing sides of the overall arrangement as shown in FIG. 5.

In the non-loaded state of said arrangement from FIG. 5, where a sling chain 8 only hangs on each of the two coupling connections 4 at the bottom, the shortening slots 10 of the two shortening hooks 1 are not aligned in a congruent manner. Due to the weight of the chain, the coupling slots 7 are aligned, in this case, with respect to one another and with respect to the central point of the upper eyelet 2, whilst the hooking-in regions 9 protrude on both sides with the shortening slots 10 and allow a chain to be easily inserted into one of the shortening slots 10 for shortening.

In the case of the exemplary embodiment of a shortening hook 1, as is shown in FIGS. 3 to 5, the shortening slot 10 is mounted in an inclined manner at a setting angle α relative to the alignment of the coupling slot 7, said angle α being an acute angle which is preferably within a range of between 10° and 40° and in a preferred manner is 15°.

In the case of the shortening hook 1 shown in FIG. 3, a pivotable safety catch 12, which prevents a chain link or chain portion, once suspended, from escaping in an unwanted manner, is provided at the top at the inlet into the shortening slot 10. Said safety catch 12 is only shown in the representation in FIG. 3 and has been left out in the representation in FIGS. 4 and 5.

The invention claimed is:

1. A shortening hook with a coupling connection for shortening sling chains in hangers, the shortening hook defining a longitudinal axis and comprising:
a hook body which includes an eyelet at a top portion of the hook body for coupling to a suspension ring, the hook body being pivotable around the suspension ring in a pivotal direction defining a plane of pivotal movement, the eyelet defining a circular cross-section and the longitudinal axis extending through a center point of the cross-section of the eyelet and defining a center line extending through the hook body, the center point of the cross-section of the eyelet and along a coupling slot, and a bottom portion of the hook body includes a coupling connection with the coupling slot, the coupling slot being delimited by two parallel side wings and being downwardly open for suspension of a chain, the hook body having a central region comprising a hooking-in region, the hooking-in region defining an upwardly open, rectilinearly extending shortening slot for receiving a portion of a chain which is coupled to the coupling connection, the hooking region being hookable by way of a free-end region, the hook body being provided with only one coupling slot and with only one shortening slot, and the coupling slot and the shortening slot are offset laterally with respect to one another, and when the eyelet and the coupling slot are aligned vertically, the shortening slot is extending in the plane of pivotal movement.

2. The shortening hook as claimed in claim 1, wherein the shortening slot is aligned relative to the coupling slot at an acute angle which diverges downward on the hook body.

3. The shortening hook as claimed in claim 2, wherein the acute angle is within the range of between 10° and 40°.

4. The shortening hook as claimed in claim 3, wherein the acute angle is 15°.

5. The shortening hook as claimed in claim 1, further comprising a safety catch mounted at an inlet of the shortening slot, the safety catch configured to prevent a suspended chain link escaping from the shortening slot.

* * * * *